July 20, 1965   J. C. LEARY   3,195,511
STOCK FOUNTAIN
Filed April 10, 1963   5 Sheets-Sheet 1
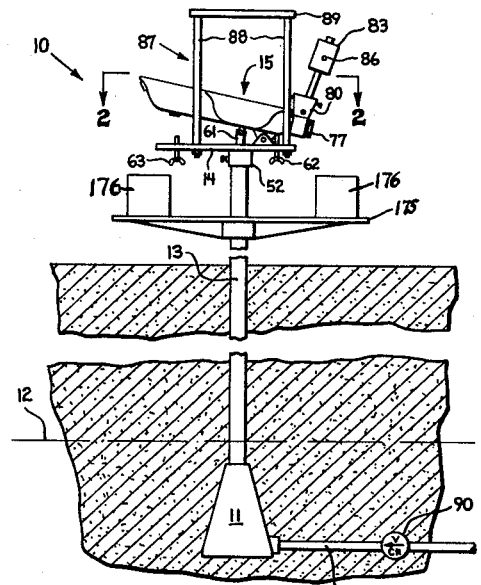
Fig. 1.
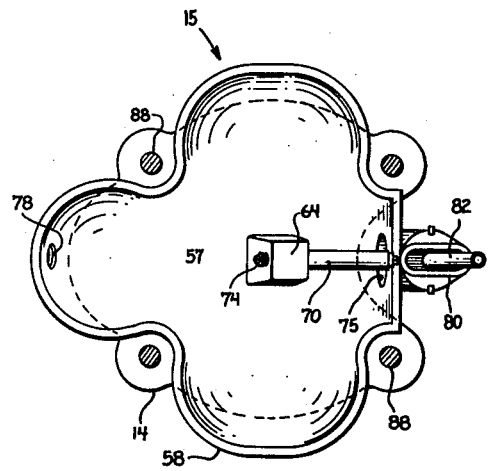
Fig. 2.
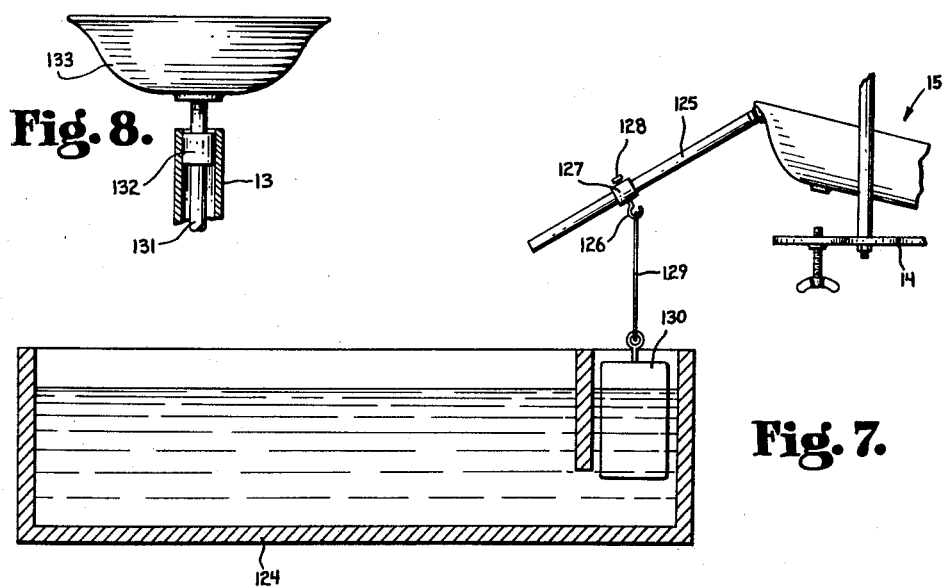
Fig. 8.
Fig. 7.
INVENTOR.
JOSEPH C. LEARY
BY
Hood, Gust & Irish
Attorneys INVENTOR.
JOSEPH C. LEARY
BY
Hood, Gust & Irish
Attorneys

INVENTOR.
JOSEPH C. LEARY

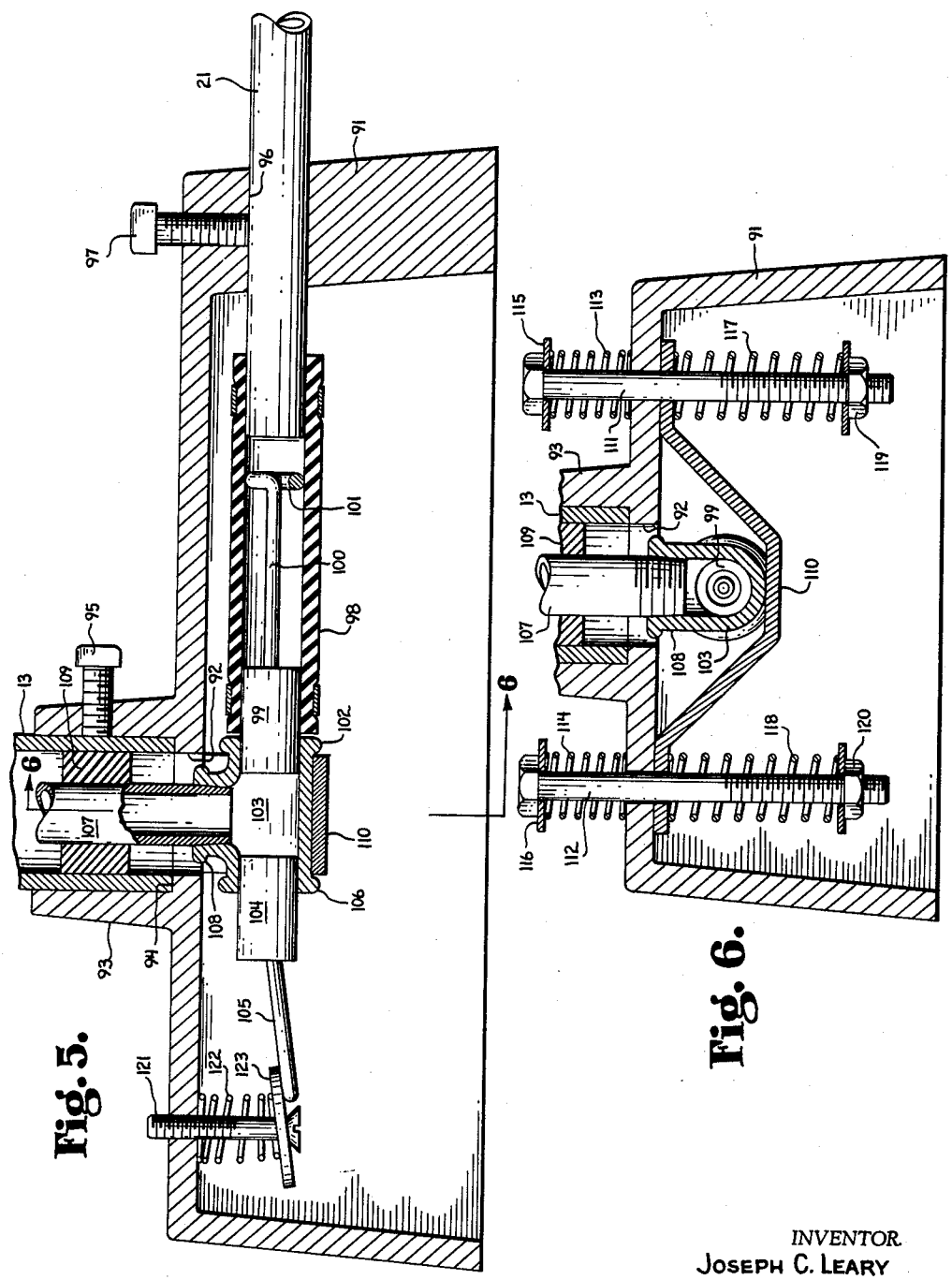

July 20, 1965 J. C. LEARY 3,195,511
STOCK FOUNTAIN
Filed April 10, 1963 5 Sheets-Sheet 5
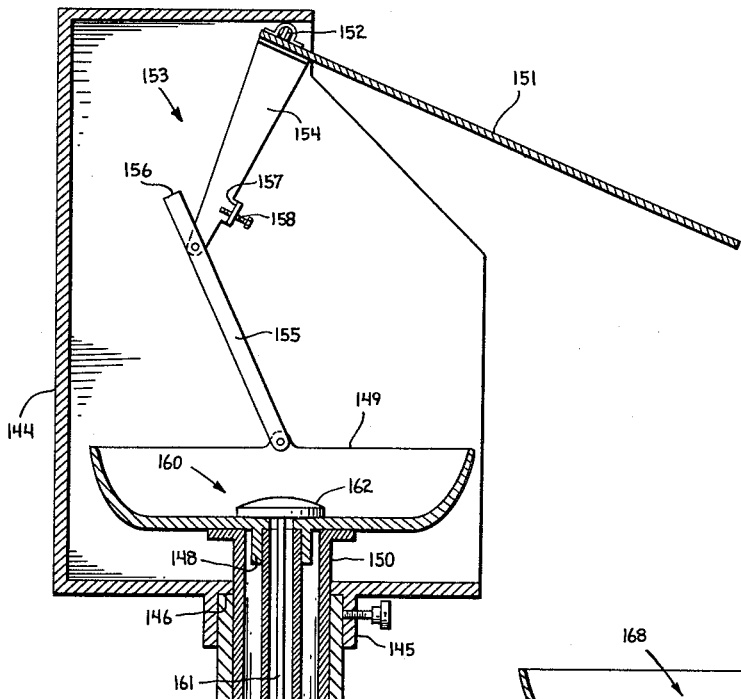
Fig. 9.
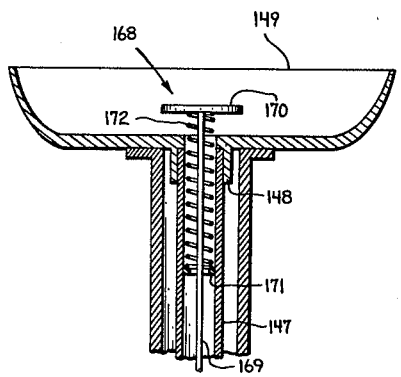
Fig. 10.
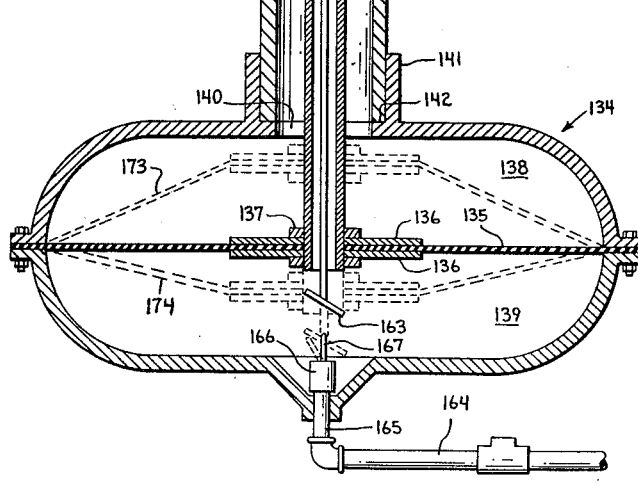
INVENTOR.
JOSEPH C. LEARY
BY
Hood, Gust & Irish
Attorneys United States Patent Office 3,195,511
Patented July 20, 1965

3,195,511
STOCK FOUNTAIN
Joseph Carrol Leary, P.O. Box 13, Greenfield, Ind.
Filed Apr. 10, 1963, Ser. No. 271,914
13 Claims. (Cl. 119—75)

The present invention relates to a stock watering fountain and is primarily concerned with the provision of a device which, when installed in the open, will be always available to stock to provide fresh, cool drinking water in unlimited quantities and at a rate sufficient to satisfy the stock, which will be readily manipulable by the stock through their instinctive actions, but which will prevent any significant waste of water.

A further object of the invention is to provide a device of the character described so constructed and designed that it will not freeze up even during the bitterest winter weather. Another object is to provide a device having the above described characteristics but which may be adjusted, during warm weather, to retain a limited quantity of water in its bowl between actuations by animals, or to provide for a continuous and overflowing supply of water.

Still another object of the invention is to provide, in a fountain of the character here under consideration, novel valving mechanism so constructed and arranged that, when an animal nuzzles a drinking bowl, fresh water will be supplied to the bowl in such a fashion as not to disturb the animal; and when the animal leaves the bowl, the water supply thereto will be automatically cut off and any water remaining in the bowl and in the conduit system leading thereto will be automatically drained to a point below the frost line whence it may, if desired, be conducted away through a tile ditch. A further object of the invention is to provide, in such an installation, means whereby the mechanism may be so adjusted during warm weather that water remaining in the bowl when it is abandoned by an animal will be caused to sluice the bowl floor from end to end and be discharged from one end of the bowl, whereby the bowl surfaces will be maintained in clear and attractive condition.

Still another object of the invention is to provide, in such an installation, an arrangement whereby water drained from the bowl will be conducted to a closed reservoir located below the frost line, thereby further obviating waste of water and eliminating the discharge of excess water into the ground, in relatively high water-table areas.

Still another object of the invention is to provide an installation of the character described in which valve-controlling operation of the bowl is dominated by a float suspended in a reservoir or drinking trough to which water may be supplied from the bowl.

Additional objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a side elevation of a preferred form of fountain constructed in accordance with the present invention, showing a portion of the earth in section;

FIG. 2 is an enlarged, horizontal section taken substantially on the line 2—2 of FIG. 1;

FIG. 5 is a section similar to FIG. 4, drawn to a somewhat reduced scale, and illustrating a modified form of valving and actuating mechanism;

FIG. 6 is a fragmentary section taken substantially on the line 6—6 of FIG. 5;

FIG. 7 is a somewhat diagrammatic view illustrating a fragment of the bowl of FIG. 3, associated with a conventional drinking trough and provided with float means dominated by the liquid in that trough for controlling the operation of valving means operatively associated with said bowl;

FIG. 8 is a fragmentary elevation, partly in section, of a simplified installation;

FIG. 9 is a sectional view illustrating an installation in which water drained from the drinking bowl is conducted to a reservoir below the frost line and is redelivered to the bowl when next the bowl is animal-actuated to open the supply valve; and FIG. 10 is a fragmental section showing a modified form of the actuator mechanism of FIG. 9.

Figure 3:
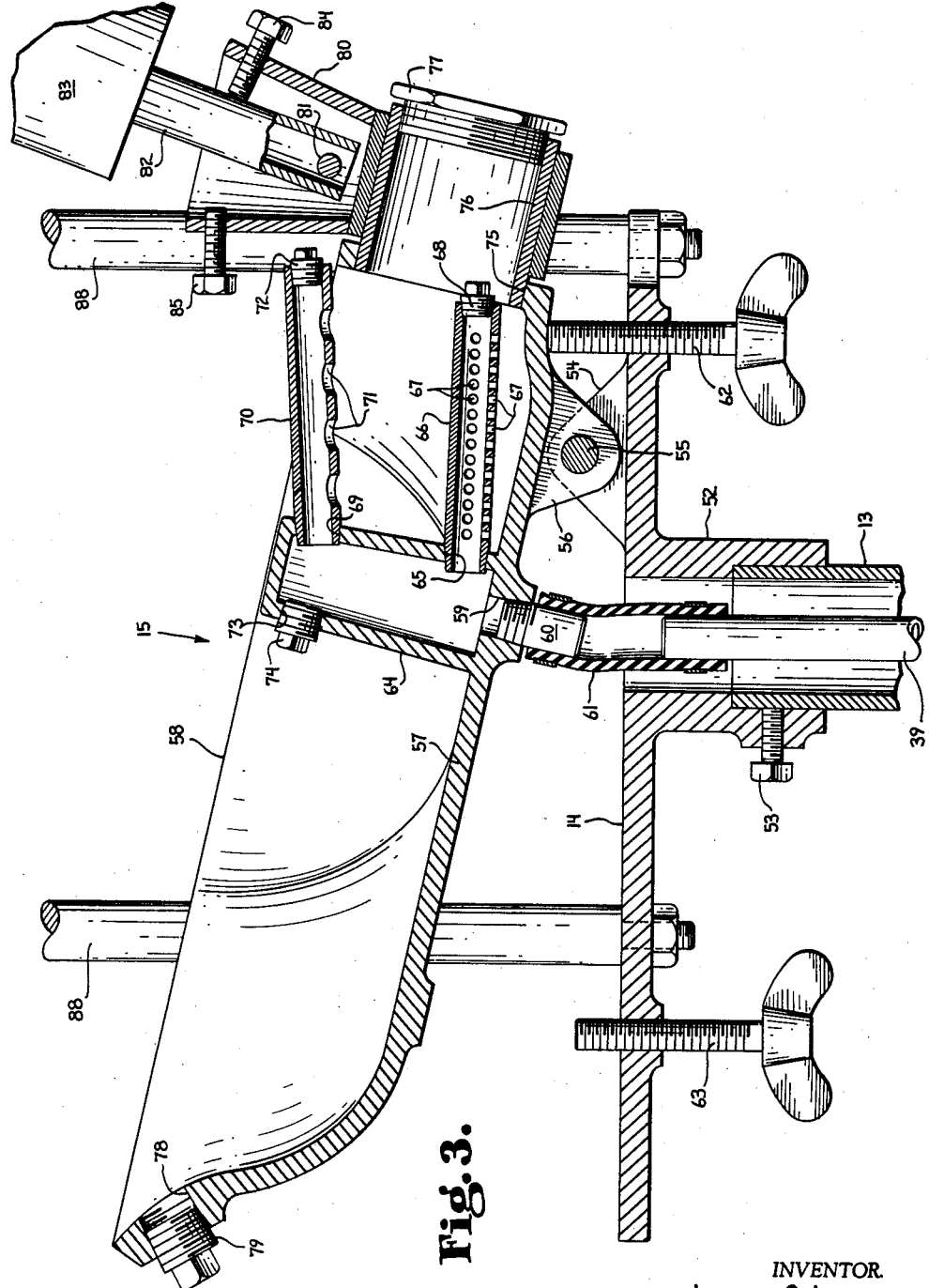
FIG. 3 is a further enlarged vertical section through a preferred form of bowl installation.

Referring more particularly to the form of invention illustrated in FIGS. 1 to 4A inclusive, a non-freezing stock watering fountain is indicated generally by the reference numeral 10. As so illustrated, the installation comprises a housing 11 adapted to be buried in the ground below the frost line indicated at 12, a standpipe 13 supported from said housing and rising to a level above the ground, a platform 14 supported at the upper end of the standpipe, and a drinking bowl, indicated generally by the reference numeral 15, supported upon the platform at a height convenient for the kind of animal to be serviced. While the preferred form of fountain has been designed primarily for cattle, it will be apparent that it may be readily arranged for use by other kinds of animals.

Figures 4, 4A:
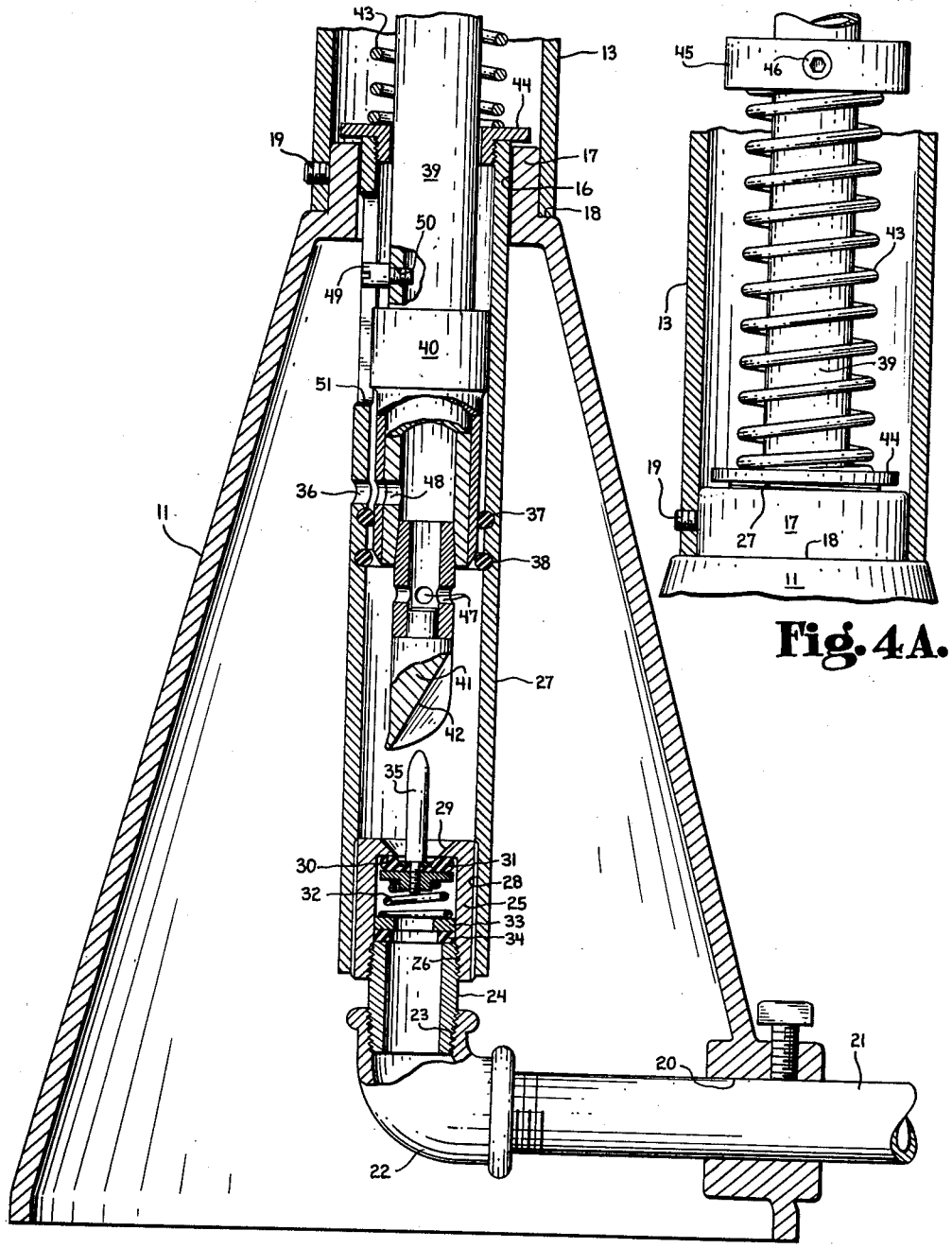
FIG. 4 is a vertical section through a preferred form of valving and actuating mechanism with which the bowl of FIG 3 may be operatively associated.
FIG. 4A is a section taken in the plane of FIG. 4 and illustrating the spring return mechanism associated with the parts illustrated in FIG. 4.

As is most clearly to be seen in FIG. 4, the housing 11 is provided with an upwardly opening mouth 16 surrounded by an upstanding, reduced hub 17 defining an upwardly facing shoulder 18; and the lower end of the standpipe 13 is sleeved on said hub, supported on said shoulder, and preferably held in place thereon by any suitable means such as, for instance, the set screw 19. The housing is further formed with a lateral entry 20 near its base, through which enters a supply conduit 21 which, within the housing 11, carries an elbow 22 internally threaded as at 23 for the reception of the lower end of a coupling member 24. The upper end of the coupling member 24 is threaded for reception in the lower end of a valve housing 25 which is internally threaded as at 26; and the several threads are so designed that, upon rotation of the valve housing 25 in one direction, the housing 25 will separate from the coupling 24 more readily than the coupling will separate from the elbow 22.

An elongated casing 27 loosely penetrates the mouth 16 of the housing 11, and the valve housing 25 is press fitted or otherwise secured in the lower end of the casing 27, means such as the keys 28 being provided to retain the valve housing 25 against rotation relative to the casing 27.

At its upper end, the valve housing 25 is formed with a port 29 surrounded at its inner end by a valve seat 30 with which a valve 31 is cooperable, said valve 31 being resiliently held against its seat 30 by a spring 32 which is confined between said valve and a ring 33 which is press-fitted in the housing 25 and bears upon an annular washer 34 which abuts the upper end of the coupling member 24. The valve 31 carries an upstanding, tiltable stem 35 which penetrates the port 29 and extends a significant distance upwardly within the casing 27.

At a point significantly above the valve housing 25, the casing 27 is formed with a radial discharge port 36. Closely below the port 36, the casing is interiorly grooved to receive an O ring, or similar sealing element 37; and at a point somewhat below the ring 37, but significantly above the valve housing 25, the casing 27 is interiorly grooved to receive a second O ring or similar sealing member 38, vertically spaced from the member 37.

The lower portion of a hollow plunger 39 is reciprocably received within the casing 27, preferably being formed with a bearing enlargement 40 which has a snug, sliding fit within said casing. The lowermost end portion 41 of the plunger (which may, if desired, constitute a separable member) is closed and is distally formed with a beveled surface 42. As is clearly illustrated in FIG. 4, the plunger and the tiltable stem are substantially coaxial and the beveled surface 42 is arranged for coaction with said stem 35.

Outside the housing 11 but within the standpipe 13, a spring 43 is sleeved on the plunger 39 and is confined between a thimble or bushing 44 threadedly received in the upper end of the casing 27 and a collar 45 adjustably mounted on the plunger 39 by means of a set screw 46, or equivalent securing means. It will be seen that, of course, the spring 43 thus acts yieldably to retain the plunger 39 in its illustrated, raised position, and to return said plunger to that position after the plunger has been depressed.

Adjacent its lower end, the plunger 39 is provided with a first radial port or ports 47, and above the ports 47, said plunger is formed with a second radial port 48. When the plunger is in its illustrated, elevated position, the ports 47 will be located between the seal means 37 and 38 while the port 48 will be located above both of said seal means.

A retainer screw 49 is threadedly received in a socket 50 radially formed in the plunger 39, preferably above the enlargement 40, and the projecting end of said screw is slidably received in an elongated slot 51 in the casing 27, whereby the plunger 39 is held against rotary movement relative to the casing 27.

It will be apparent that, when the plunger 39 is moved downwardly against the tendency of the spring 43, the beveled surface 42 thereof will engage and tilt the stem 35, thereby tilting the valve 31 against the tendency of the spring 32 to open the port 29 to an extent determined by the degree of downward movement of the plunger 39. The port or ports 47 will begin to pass the seal means 38 just as the surface 42 engages the stem 35; so that, as the valve 31 opens, the ports 47 are opened to communication with the interior of the casing 27 below the seal means 38, so that water flowing through the port 29 may enter the interior of the plunger 39 through said ports 47. At the same time, the port 48 will pass the seal means 37 to be located between the seal means 37 and 38, so that water cannot escape from the interior of the plunger through the port 48. In the extreme lowermost position of the plunger 39, the port 48 will be disposed below the seal means 38 and the valve 31 will be tilted to a maximum degree to provide for maximum liquid flow from the supply line 21 to and through the interior of the plunger 39.

Now, when downward force on the plunger is released and the spring 43 is permitted to return the plunger to its illustrated position, it will be apparent that the valve 31 will close, the ports 47 will move into the region between the seal means 37 and 38 and the port 48 will move into substantial registry with the port 36 whereby any water standing above the port 48 in the plunger 39 will be discharged to the interior of the housing 11. As is clearly illustrated, that housing is open at its bottom, and such discharged water will be absorbed in the earth in which the housing is buried below the frost line.

The platform 14 is preferably provided with an internally shouldered, downwardly opening hub 52 which receives and is supported upon the upper end of the standpipe 13 being secured thereto by any suitable means such as, for instance, the set screw 53. On its upper surface, the platform carries a pair of upstanding, perforated ears 54 supporting a substantially horizontal axle 55. One or more perforated ears 56 depend from the floor 57 of the bowl 15 and the axle 55 penetrates the ear or ears 56 to provide a rockable mounting for said bowl. The bowl includes an upstanding, perimetral wall 58.

The bowl floor 57 is formed with an inlet port 59 in which is threadedly received a short spud 60 connected, by a hose section or similar flexible conduit means 61, with the upper end of the plunger 39. The conduit 61 is stiff enough to transmit actuating forces between the bowl 15 and the plunger 39. An adjustable stop screw 62 is mounted in the platform 14 for engagement by the rear end of the bowl 15 to limit upward movement of the plunger 39 under the influence of the spring 43, and an adjustable stop screw 63 is mounted in the platform 14 for engagement by the forward portion of the bowl to limit downward rocking moveemnt of said forward bowl end.

The port 59 opens into, and is guarded by, an upstanding tower 64 which may be integral with the bowl floor 57. Said tower is formed with a first rearwardly-opening, threaded port 65 closely adjacent its base; and said port is adapted to receive a first tube 66 which is formed, throughout its length, with a multiplicity of perforations 67 some of which desirably will open directly downwardly toward the bowl floor 57 and others of which may preferably open laterally, as shown. The distal end of the tube 66 is closed, preferably by a removable plug 68.

The tower 64 is formed with a second threaded, rearwardly opening port 69 near its upper end, and said port 69 receives a second tube 70 which is formed with a plurality of ports 71 which are preferably much larger than the perforations 67 in the tube 66. The axes of the ports 65 and 69 are preferably disposed in a common vertical plane, so that the tube 70 is disposed in vertical registry with the tube 66 and water discharged from its ports 71 will pour directly upon the tube 66. The distal end of the tube 70 is closed, preferably by a removable plug 72.

The tower 64 is formed with a third threaded port 73 which is disposed near its top and which opens forwardly. In the illustrated arrangement of the parts, the port 73 is closed by a removable plug 74.

At its rear end, the bowl 15 is formed with a large discharge port 75 in which is received a short flush tube 76, the outer end of which, in the illustrated arrangement of the parts, is closed by a removable plug 77. At its forward end, and near the upper edge of the perimetral wall 58, the bowl is formed with a further port 78, opening forwardly and downwardly, as shown. In the illustrated arrangement of the parts, the port 78 is closed by a removable plug 79.

At its rear end, and preferably on the flush tube 76, the bowl 15 fixedly carries an upwardly opening cup or pocket 80 traversed, near its base, by an axle 81 which is parallel with the axle 55. The lower end of a lever 82 is pivotally supported upon the axle 81, and said lever carries a weight 83 which may be adjusted longitudinally of said lever and secured in any adjusted position thereon by suitable means such as, for instance, the set screw 86. Stop screws 84 and 85 are adjustably mounted in the opposite end walls of the pocket 80 to act as abutment means oppositely limiting the throw of the lever 82 for a purpose which will be explained.

Preferably, but not necessarily, the bowl is guarded by a frame indicated generally by the reference numeral 87 and comprising corner posts 88 upstanding from the platform 14 and supporting a cap 89. While such a frame permits ready access of animals' mouths to the bowl, it tends to prevent them from getting their feet into the bowl and to prevent smaller animals from climbing onto the bowl.

Preferably, a check valve 90 is arranged in the supply conduit 21 ahead of the elbow 22 to prevent siphonage of water back to a supply reservoir (not shown) in case abnormal conditions should arise in the system.

From the above description, it will be apparent that, with the parts arranged as illustrated and described, the spring 43 will normally hold the bowl 15 in its attitude illustrated in FIGS. 1 and 3 in which the bowl floor 57 inclines forwardly and upwardly and in which the valve 31 is closed and the interior of the plunger 39 is open to the interior of the housing 11 through the registering ports 48 and 36. Animals having found, through one or more previous experiences, that water is available in the bowl 15, will instinctively nuzzle that bowl. Such nuzzling will overcome the effect of the spring 43 to depress the forward end of the bowl. Such bowl movement will depress the plunger 39, whereby the ports 47 will be shifted to a position below the seal means 38, the port 48 will be shifted to a position below the seal means 37 and the beveled surface 42 of the plunger will engage and tilt the stem 35 to open the valve 31, whereby liquid will flow from the supply conduit 21 through the port 29 and the ports 47 to the interior of the plunger 39 and thence, through the flexible conduit 61 and the port 59 to the interior of the tower 64 to be discharged into the bowl 15 through the ports 71 of the tube 70 and the perforations 67 of the tube 66. The rate of flow of water into the bowl will depend upon the eagerness of the animal, since the animal will instinctively press harder and harder until the rate of flow of water into the bowl corresponds to the rate at which the animal wishes to drink. Since water is being supplied from the conduit 21 which is buried below the frost line, its temperature, both winter and summer, will be approximately 55° F. Thus, any film of ice which may have been formed, during cold weather, upon any of the parts of the bowl, will be quickly melted; and, since water pours from the ports 71 upon the tube 66, any clogging of the perforations of the tube 66 will be very quickly washed away. It will be apparent that since the water enters the bowl downwardly and in the rearmost region of the bowl, remote from the region being nuzzled by the animal, it will flow smoothly and quietly to the latter region and will not startle or otherwise disturb the drinking animal.

As the bowl 15 is so tilted by the animal, the lever 82 with its weight 83 will be moved past dead center position, and the lever will fall in a counter-clockwise direction until it is stopped by the screw 85. Now, when the animal is satisfied, and leaves the fountain, the spring 43 will return the parts to their illustrated positions. Any water remaining within the bowl will flow to the rear end thereof. As the port 48 rises above the seal means 37, it attains registry with the port 36, and water remaining in the plunger, the tower and the tubes 66 and 70 will promptly drain to the open-bottomed housing 11. A siphon action, of course, will thus be created to cause water remaining in the rear end of the bowl above the level of the perforations 67 to be drawn into the tube 66 and thence through the tower and the plunger to discharge.

In extremely cold weather, water which is slopped over the rim of the perimetral wall 58 may freeze on the outside of the bowl. Since it is desirable that the effect of the spring 43 shall be so adjusted that no great force need be exerted by animals to depress the forward end of the bowl, it is possible that an accumulation of ice on the forward portion of the bowl might tend to prevent complete return of the parts to their illustrated positions. However, as the forward end of the bowl moves upwardly, the lever 82 will promptly be carried beyond its dead center position, and it will fall in a clockwise direction to strike the abutment screw 84 with a hammer blow, thus exerting a sharp force in a clockwise direction upon the bowl to aid the spring 43 in returning the parts to normal rest condition.

It will be appreciated that the tubes 66 and 70 may be removed from their ports 65 and 69, whereupon those ports may be closed by removable plugs (not shown). Now, if the plug 77 is removed from the flush tube 76 and the plug 74 is removed from the port 73 in the tower 64, a different kind of action will be attained upon manipulation of the bowl. It is an established fact that, if meat animals can be persuaded to increase their water intake, they improve in their rate of weight gain. It has been discovered that animals, like humans, prefer fresh, clear, cool water, and that they will drink more frequently and more copiously if a supply of such water is available. However, most domestic animals, at least, will drool to some extent when drinking, and therefore each animal which uses a fountain of the character here under consideration is likely to deposit some saliva in the bowl. Under some circumstances, such deposits tend to accumulate on the bowl surfaces to create a scum on the top of the water when the next supply is delivered to the bowl. It is desirable, therefore, to provide a sluicing action of some force which will tend to wash away any material which is deposited in the bowl.

With the ports 65 and 69 closed and the ports 73 and 75 open, when the front end of the bowl is depressed, a stream of water under considerable pressure will be directed forwardly against the front portions of the perimetral wall 58 of the bowl. Then, when the bowl is allowed to return, under the influence of the spring 43, to its position as illustrated in FIGS. 1 and 3, any water remaining in the bowl will flow rapidly rearwardly to be discharged through the flush tube 76; and it is found that the sluicing action provided by the relatively strong stream emanating from the port 73 and by the rush of water from the front end of the bowl to be discharged through the flush tube 76, quite effectively clears the surfaces of the bowl. Thus, even in the summer time, when the problem of freezing does not arise, it is desirable to cause the bowl to be tilted to its illustrated position whenever it is not in use, whereby water will be discharged from the bowl as soon as an animal stops drinking. For such operation, it may be desirable to retract the stop screw 62 to its limiting position, so that the bowl will be even more sharply tilted than as shown during periods when it is not in use by an animal.

It will be noted that the rate of flow of water from the supply conduit 21 to the bowl is variable in accordance with the degree of depression of the forward end of the bowl 15. That is, the stem 35 is progressively rocked as the plunger 39 is moved downwardly; and the greater the degree of rocking or tilting of said stem, the larger will be the effective flow path past the valve 31. Additionally, when the plunger is fully depressed, the port 48 in the plunger, as well as the ports 47, will be disposed below the seal ring 38, whereby water flowing past the valve 31 may attain access to the interior of the plunger 39 through the port 48 as well as through the ports 47.

As has been explained above, the standpipe 13 extends from the housing 11 which is buried below the frost line 12 to a suitable level above the ground at which the platform 14 is to be supported; and the plunger 39 extends through the mouth 16 of the housing 11 and above the top of the standpipe 13. Thus, if an occasion should arise to make repairs in the control system, that entire system can be lifted free without disturbing the standpipe 13 or the housing 11 and without having to dig to the location of the housing. It has been explained that relative rotation between the plunger 39 and the casing 27 is prevented by the engagement of the screw 49 in the slot 51 and that the valve housing 25 is rotationally fixed relative to the casing 27. Thus, if the screw 53 is loosened and the platform 14 is lifted off the standpipe 13, after separation of the flexible section 61 from the spud 60 or from the plunger 39, the upper end of that plunger is exposed. Now, a pipe wrench can be applied to the plunger to rotate it about its own vertical axis, thereby rotating the casing 27 and the valve housing 25. As has been explained, this action will release the coupling 24 from the elbow 22, whereupon the whole assembly of plunger 39, casing 27 and valve assembly can be removed for inspection, repair and/or replacement.

In FIGS. 5 and 6, I have illustrated a modified form of control assembly which is somewhat simpler and cheaper for initial installation than the assembly just described, but which has the inherent disadvantage that, if inspection or repair becomes necessary, the assembly must be exposed by digging.

In FIGS. 5 and 6, I have illustrated a housing 91 having an upwardly opening mouth 92 surrounded by an upstanding hub 93 which is formed to provide an internal, upwardly facing shoulder 94 for the accommodation of the lower end of the standpipe 13 which may be secured in position by suitable means such as, for instance, the set screw 95. The housing 91 is further formed with a lateral entry 96 through which the supply conduit 21 penetrates to the interior of the housing and may be fixed therein by suitable fastening means such as the set screw 97.

Within the housing 91, the supply conduit 21 is fitted with a flexible section 98 which may be a relatively stiff hose; and a valve 99, similar in construction to the valve 25 and having a tiltable stem 100, is mounted in the distal end of the conduit section 98, the stem 100 having an enlarged head 101 which snugly engages the interior of the flexible section 98. Said valve 99 is also received in one arm 102 of a T-fitting 103, thus controlling flow from the supply conduit 21 to the interior of the fitting 103. A second valve 104 with a tiltable stem 105 is received in the opposite arm 106 of the fitting 103 with its stem 105 extending away from said fitting to control exhaust flow from the fitting 103. A pipe 107 has its lower end received in the stem 108 of the fitting 103 and extends upwardly through the standpipe 13 for connection to the bowl 15 through a flexible connection like the connection 61. The pipe 107 is mounted for vertical reciprocation within the standpipe 13, being guided therein in one or more bushings 109; and the fitting 103 and pipe 107 are supported by a hanger 110 most clearly illustrated in FIG. 6.

As shown, pins 111 and 112 penetrate suitable openings in the roof of the housing 90 and in the opposite arms of the hanger 110. Said pins are supported yieldably by means of springs 113 and 114 sleeved on said pins, respectively, and confined between the housing roof and washers 115 and 116 bearing against the heads of the respective pins. Other springs 117 and 118 are sleeved on the lower portions of the pins 111 and 112 and are confined between the respective arms of the hanger 110 and nuts 119 and 120 adjustably mounted on the threaded ends of said pins.

A screw 121 is adjustably mounted in a threaded perforation in the roof of the housing 91 and a coiled spring 122 is sleeved on said screw and confined between the roof of the housing and an abutment washer 123 which bears normally against the screw head, said washer being positioned in the path of the stem 105 of the valve 104.

It will be apparent that the springs 113, 114, 117 and 118 normally hold the control assembly and the bowl 15 in their illustrated positions, but that, when the forward end of the bowl is depressed, the pipe 107 and fitting 103 will be depressed against the tendency of the above-mentioned springs. As the fitting 103 moves downwardly, the valve stem 105 will be moved out of engagement with the abutment washer 123, whereby the valve 104 will be closed. Concurrently, the flexible section 98 of the supply conduit 21 will be flexed, whereby the stem 100 of the valve 99 will be tilted to open that valve, and water will flow from the supply conduit through the valve 99, the fitting 103 and the pipe 107 to the bowl 15. When the animal abandons the bowl, the springs 113, 114, 117 and 119 will act through the hanger 110 to return the parts to their illustrated positions, whereby the valve 99 will be closed to cut off supply to the bowl and the valve 104 will be opened to drain all liquid standing in the bowl and in the pipe 107, such liquid being discharged to the interior of the housing 91 which, like the housing 11, is open at its bottom so that such discharged liquid will be absorbed in the ground.

It will be apparent that the several above-described modes of operation of the bowl and its asociated parts will be identical whether the control mechanism of FIG. 4 or that of FIG. 5 is associated therewith.

Most of the non-freezing characteristics of the above-described system may be attained through the association of a simplified bowl form, as illustrated in FIG. 8, with either of the control mechanisms above-described. As there illustrated, the standpipe 13 encloses a pipe 131 which is reciprocably guided in one or more bushings 132 and which may be the equivalent either of the plunger 39 of FIG. 4 or of the pipe 107 of FIG. 5. A simple bowl 133 is supported directly upon the pipe 131 which communicates with a port in the floor of the bowl. That port may or may not be guarded by the equivalent of the tower 64. It will be apparent that, when the bowl 133 is depressed, water will be supplied thereto from the supply conduit 21; and when the bowl is released, it will be raised, either by the equivalent of the spring 43 or by the equivalent of the spring arrangements illustrated in FIG. 6, to open the bowl to exhaust either through the equivalent of the ports 48 and 36 or through the equivalent of the valve 104.

In any of the described systems, a check valve such as that indicated at 90 in FIG. 1 will preferably be installed in the supply conduit ahead of the control valve.

In some circumstances, it may be desirable to arrange the fountain, in any of the forms above described, to supply a conventional drinking trough such as that illustrated at 124 in FIG. 7. For that purpose, the plug 79 is removed from the port 78, and a pipe 125 is installed in that port. It will be seen that the port is so arranged that such a pipe, when so installed, will incline forwardly and downwardly from the bowl 15. Hook means 126, carried by a sleeve 127 adjustably mounted on the pipe 125 and held in adjusted position by any suitable means such as a set screw 128, supports a flexible cable 129 from which depends a weight 130. The mass and buoyancy of the weight 130 are such that, when the water level in the trough 124 stands at a predetermined height, the spring means 43 or that illustrated in FIG. 6 will overcome the weight and will lift the bowl 15 to a position in which the supply valve will be closed and the exhaust valve will be open; but, when the liquid level in the trough drops to a predetermined height, the weight 130 will overcome the spring means to depress the forward end of the bowl, thus opening the supply valve and closing the exhaust valve. Thereupon, liquid will be supplied to the bowl and will rise to a level at which it will flow through the port 78 and the pipe 125 to the reservoir 124 until the predetermined water level in the reservoir has been achieved, whereupon the front end of the bowl will rise and the supply valve will be closed and any water remaining in the bowl will be drained through the exhaust valve.

During periods when freezing temperatures will not be encountered, the set screw 62 may be adjusted to a position in which the bowl 15 will assume an attitude such that the port 48 of the assembly of FIG. 4 will never rise above the seal means 37, but in which the beveled surface 42 of the plunger end 41 is just out of contact with the stem 35. Under these circumstances, of course, water will stand in the bowl between actuations by animals, to reduce water waste to a minimum, though many of the above advantages of the previously described mode of operation will be lost. To accomplish a comparable result with the assembly of FIGS. 5 and 6, the screw 121 may be so adjusted that the valve 104 will never open. As a still further alternative, and under circumstances such that water conservation is unnecessary and an overflow is desirable or at least unobjectionable, of course the screws 62 and 63 may be adjusted to hold the bowl, either temporarily or for extended periods, in a position such that the supply valve is always open and the exhaust valve is always closed. If, under such circumstances, it is desired to direct the overflow in one direction, the plug 79 may be removed from the port 78; or if that plug is left in place, water will overflow the wall 58 substantially throughout its perimeter.

For any one of several different reasons, it may be undesirable to discharge excess water either to the surface of the ground or to subsurface areas; and in such situations, the forms of invention illustrated in FIGS. 9 and 10 may be used. In that form of my nonfreezing fountain, a two-part housing 134 is adapted to be buried below the frost line. The two housing parts cooperate to grip the perimetral region of a flexible diaphragm 135 which spans the interior of the housing. As shown, a pair of stiffener plates 136 reinforces the central portion of the diaphragm, being held in place thereon by collar means 137; and the diaphragm divides the interior of the housing 134 into upper and lower inversely-variable volume chambers 138 and 139. The upper part of the housing is provided with an upwardly-opening, central mouth 140 which is surrounded by an upstanding hub 141 within which is defined a shoulder 142; and the lower end of a standpipe 143 is snugly received in the hub 141 to rest on said shoulder.

A frame or enclosure 144 is formed with a depending hub 145 surrounding a downwardly facing shoulder 146; and said hub is sleeved on the standpipe 143, whereby the frame 144 is supported above the ground level. A pipe or conduit means 147 has its lower end fixedly secured in the collar means 137 and penetrates the diaphragm 135 to open into the chamber 139. The upper end of the pipe 147 is fixedly secured in the mouth 148 which opens through the floor of a bowl 149 which is provided with a depending sleeve 150 which is reciprocably guided in the standpipe 143, as shown.

A cover 151 is hingedly mounted as at 152 at the upper end of the frame and is movable between a bowl-covering position and a bowl-exposing position, being biased, by gravity or otherwise, toward the former position. Toggle means indicated generally by the reference numeral 153 provides an operative connection between the cover 151 and the bowl 149, and thus the pipe 147. As shown, said toggle means comprises upper arms 154 fixed to move with the cover 151 and lower arms 155 pivotally connected to the distal ends of the arms 154 and to the bowl 149. It will be apparent that, as the cover 151 moves under its bias toward bowl-covering position, the toggle means 153 will act to lift the bowl 149 and the pipe 147; and as the cover moves toward bowl-exposing position, the toggle means will act to depress the bowl and pipe.

Preferably, at least one of the arms 155 will be provided with an extension 156 engageable, when the toggle means moves past dead center position, with a stop 157, whereby the cover will be held in bowl-exposing position and the bowl and pipe 147 will be held in their depressed positions. For a reason which will become apparent, the stop 157 carries a screw 158 which is adjustable into and out of a position in which it will cooperate with the extension 156 to prevent movement of the toggle mechanism through its dead center condition.

Valve actuator means is indicated generally by the reference numeral 160 and comprises a rod 161 freely received in the pipe 147 and extending from one end to the other thereof, a float 162 fixed to the rod 161 and positioned in the bowl 149, and a foot 163 fixed to the rod and position in the chamber 139.

As shown, a supply line 164 is buried in the ground below the frost line and is provided with an upturned section 165 which enters the bottom of the chamber 139. Within the chamber, a valve 166 is positioned to control flow through the supply line, said valve being provided with an upstanding, tiltable stem 167. As in the previous embodiments of the invention, the valve 166 is normally closed and will be opened by tilting of the stem 167.

The cover 151 will normally occupy its bowl-obstructing position, in which the bowl 149 and pipe 147 will be in their uppermost positions and the diaphragm 135 will occupy approximately the dotted line position indicated by the reference numeral 173. It has been established that domestic animals will quickly develop a recognition for the fact that water will be available to them when they lift the cover 151; and said cover is so designed that it is readily actuable by such animals. As the cover is raised, the toggle mechanism 153 will act to depress the bowl 149 and the pipe 147, thus flexing the diaphragm 135 to its dotted line position indicated by the reference numeral 174. The actuator 160 will move downwardly with the bowl and pipe and the foot 163, which preferably is inclined as indicated, will engage the stem 167, which is axially aligned with the rod 161, to tilt said stem in the manner indicated in broken lines, thus opening the valve 166. Obviously, as the diaphragm is moved from its position indicated by the reference numeral 173 to that indicated by numeral 174, the volume of the chamber 139 will be reduced. Water now flows from the supply line to fill the reduced-volume chamber 139 and then to rise in the pipe 147 and flow into the bowl 149 where it will be available to the animal. If the rate of water consumption of the animal is slower than the rate of water supply to the bowl, the float 162 will rise as the water level rises in the bowl. As the float rises, of course, the foot 163 is gradually moved upwardly to permit the stem 167 to move toward its vertical, valve-closing position, whereby the rate of supply to the bowl is reduced. Thus, the level of water in the bowl 149 will be maintained substantially uniformly as the animal drinks.

When the animal's thirst has been satisfied and it withdraws its head from beneath the cover 151, gravity will tend to return the cover to bowl-obstructing position. Thus, the bowl and the pipe 147 will be affirmatively raised and the diaphragm will be flexed to its position indicated in broken lines at 173, whereby the chamber 139 will be significantly enlarged. Promptly after the beginning of upward movement, the foot 163 will be withdrawn from engagement with the stem 167 to cut off supply from the line 164; and thus enlargement of the chamber 139 produces a partial vacuum whereby any water remaining in the bowl 149 and the pipe 147 will be caused to flow quickly into the enlarged chamber 139. Since that chamber is well below the frost line, water can safely stand in the chamber without freezing.

When next the cover 151 is raised by an animal seeking water, reduction in the volume of the chamber 139 will force the water standing therein up through the pipe 147 and into the bowl 149. In many instances, this will lift the float 162 sufficiently so that the foot 163 will not engage the stem 167 until after the level in the bowl 149 has been reduced by the animal. As the water level in the bowl drops, however, the actuator 160 will move downwardly until the foot 163 engages and actuates the stem 167 to open the valve 166.

During freezing weather, of course, the screw 158 will be so adjusted as to engage the extension 156 before the toggle mechanism 153 moves through its dead center position, so that the cover will fall and the chamber 139 will be enlarged, as above described, whenever an animal abandons the fountain. During warmer weather, however, the screw 158 may, if desired, be retracted to a degree such that the mechanism 153 may be moved through its dead center position to bring the extension 156 into engagement with the stop 157. Now, the cover will remain in its bowl-exposing position and the bowl, the pipe 147 and the diaphragm 135 will remain in their lowermost positions. Thereby, of course, water will be permitted to flow into the bowl 149 until the float 162 is raised sufficiently to move the foot 163 out of engagement with the stem 167; and water will stand in the bowl at that level until an animal begins to drink from the bowl. Thereupon, the float 162 will move downwardly to cause the foot 163 to open the valve 166, and water will thereupon flow into the bowl until the level therein rises sufficiently to lift the foot 163 out of engagement with the stem 167.

In FIG. 10, I have shown a modified form of actuator means indicated generally by the reference numeral 168. In this form, the pipe 147 and bowl 149 will be identical with the structure previously described, but the rod 169 of the actuator mechanism will carry a head 170 at its upper end and the actuator mechanism will be held normally in its upper position, relative to the bowl, by a spring 172 which is confined between the head 170 and a shoulder 171 within the pipe 147. In this form of fountain, the animal must nuzzle the head 170 to depress the actuator 168 in order to cause water to flow from the supply line. In other respects, the form of invention illustrated in FIG. 10 will operate in the manner described with respect to FIG. 9.

If desired, a separate platform 175 may be suitably mounted on the standpipe 13 or 143, in any one of the forms of invention disclosed, to support blocks of salt 176 or anything else which the proprietor may wish to expose to the stock.

I claim as my invention:

1. In a non-freezing stock watering fountain, a bowl supported above the ground, a source of liquid supply buried below the frost line, conduit means connected between said source and said bowl, said conduit means including an animal-actuated movable pipe associated with said bowl and yieldably biased toward one extreme position but movable to another extreme position, a first valve means disposed in said conduit means and below said frost line for controlling flow through said pipe from said source to said bowl, a second valve means disposed in said conduit means and below said frost line for controlling flow away from said bowl through said pipe to a point below the frost line, and means actuated by movement of said pipe toward said other extreme position to open said first valve means and close said second valve means and actuated by movement of said pipe to said one extreme position to close said first valve means and open said second valve means.

2. In a non-freezing stock watering fountain, a bowl mounted above the ground to rock about a generally horizontal axis and having a floor extending forwardly from said axis, said floor being formed with a port therein opening into an upstanding tower, said tower being closed except for three ports, the first of said ports opening rearwardly from said tower adjacent the base thereof and receiving a first tube closed at its distal end and formed with a plurality of downwardly-opening orifices, the second of said ports opening rearwardly from said tower adjacent the top thereof and receiving a second tube closed at its distal end and formed with a plurality of downwardly opening holes, said tubes being disposed substantially in a common vertical plane, and the third of said ports opening forwardly from said tower, a plug removably received in and closing said third port, spring means yieldably holding said bowl in a position in which its floor inclines upwardly and forwardly from said axis, and a liquid supply and exhaust pipe means connected to said port in said bowl floor.

3. The combination of claim 2 in which said bowl includes a perimetral wall formed at its rear end with a discharge port, and a removable plug for closing said discharge port.

4. The combination of claim 2 in which said bowl includes an upstanding perimetral wall formed, at its forward end and near its upper edge, with a threaded port, and a removable plug for closing said threaded port.

5. In a stock watering installation, a bowl mounted at an elevation convenient for cows and to rock about a generally horizontal axis, supply conduit means connected to deliver water to said bowl, valve means controlling flow through said conduit means to said bowl, spring means yieldably holding said bowl in a position in which its floor is inclined upwardly and forwardly, means providing an operative connection between said bowl and said valve means to open said valve means when the forward end of said bowl is depressed against the tendency of said spring means, said bowl including an upstanding perimetral wall formed, at its forward end and near its upper edge, with a port, a pipe connected with said port and inclining forwardly and downwardly therefrom, an opentopped reservoir disposed at a level convenient for animals smaller than cows and to receive liquid from the distal end of said pipe, and a weighted float supported to move with said pipe and to be at least partially immersed in liquid in said reservoir, the mass and buoyancy of said weight being such that, when the liquid level in said reservoir drops below a predetermined point, said weight will overpower said spring means to depress the forward end of said bowl.

6. In a non-freezing stock watering fountain, a bowl mounted above the ground to rock about a generally horizontal axis, a liquid supply and exhaust pipe means connected to said bowl, valve means buried below the frost line for controlling flow through said pipe means, means providing an operative connection between said bowl and said valve means to open flow to said bowl when said bowl is rocked in one direction and to open flow from said bowl when said bowl is rocked in the opposition direction, spring means yieldably resisting bowl movement in said one direction and normally effective to return said bowl after movement thereof in said one direction, and inertia means effective, as said bowl moves under the influence of said spring means, to deliver a hammer blow to said bowl tending to move it to the limit of its stroke in said opposite direction.

7. In a non-freezing stock watering fountain, a bowl mounted above the ground to rock about a generally horizontal axis, spring means yieldably holding said bowl in an attitude in which the floor of said bowl inclines forwardly and upwardly from said axis, a liquid supply and exhaust pipe means connected to said bowl, valve means buried below the frost line for controlling flow through said pipe means, means providing an operative connection between said bowl and said valve means to open flow to said bowl when the forward end of said bowl is depressed and to open flow from said bowl and shut off flow to said bowl when the forward end of said bowl is raised to its upper limit, an upstanding weighted lever mounted on said bowl behind said axis to swing about a second axis substantially parallel with said first-named axis, said second axis being movable, as said bowl is rocked, to cause said lever to fall forwardly as the forward end of said bowl is depressed and to fall rearwardly as said bowl end is raised toward its upper limit, and adjustable abutment means on said bowl arranged to receive a hammer blow from said lever as the same falls rearwardly.

8. In a device of the class described, a housing adapted to be buried in the ground below the frost line and having an upwardly-opening mouth and an entry near its base, a supply conduit located below the frost line and entering said housing through said entry, an elongated casing freely entering said housing through said mouth and having a releasable connection with said supply conduit within said housing, normally-closed valve means carried by said casing for controlling flow from said supply conduit to said casing, said casing being formed with a discharge port above said valve means, a hollow plunger having its lower end reciprocably received in said casing and extending upwardly beyond the upper end of said casing, two vertically-spaced seal means located in said casing below said discharge port but above said valve means and cooperable with said plunger to establish therewith seals against significant liquid flow, the lower end of said plunger being closed and said plunger being formed with a first radial port and with a second radial port located above said first radial port, spring means yieldably holding said plunger at the upper limit of its stroke, where said first radial port is disposed above at least one of said seal means and said second radial port is disposed above both of said seal means, and means located above the ground, operatively connected to said plunger and manipulable to shift said plunger downwardly against the tendency of said spring means to locate said first radial port below both of said seal means and said second radial port below at least one of said seal means, the lower end of said plunger cooperating with said valve means, upon such downward movement, to open said valve means.

9. The device of claim 8 in which said valve means includes an upstanding stem substantially coaxial with said plunger and tiltable to open said valve means, and the lower end of said plunger is bevelled to engage and tilt said stem when said plunger is depressed.

10. The device of claim 8 including means restraining said plunger against rotation about its axis relative to said casing, and in which the connection between said casing and said supply conduit is releasable by rotary movement of said casing about its own axis.

11. The device of claim 8 including a standpipe supported from said housing and enclosing the upper portion of said plunger to a level above the ground.

12. In a non-freezing stock watering fountain, a bowl mounted above the ground to rock about a generally horizontal axis and having a floor extending forwardly from said axis, said floor being formed with a port therein, a housing buried in the ground below the frost line and having an upwardly-opening mouth, a supply conduit located below the frost line and entering said housing, an elongated casing freely entering said housing through said mouth and having a releasable connection with said supply conduit within said housing, normally-closed valve means carried by said casing for controlling flow from said supply conduit to said casing, said casing being formed with a discharge port above said valve means, a hollow plunger having its lower end reciprocably received in said casing and extending upwardly into communication with said port in said bowl floor and operative connection with said bowl, two vertically-spaced seal means located in said casing below said discharge port but above said valve means and cooperable with said plunger to establish therewith seals against significant liquid flow, the lower end of said plunger being closed and said plunger being formed with a first radial port and with a second radial port located above said first radial port, spring means yieldably holding said plunger at the upper limit of its stroke, where said first radial port is disposed above at least one of said seal means and said second radial port is disposed above both of said seal means, and said bowl is held in a attitude in which its floor inclines forwardly and upwardly, said bowl acting, when its forward end is depressed against the tendency of said spring means, to shift said plunger downwardly to locate said first radial port below both of said seal means and said second radial port below at least one of said seal means, the lower end of said plunger cooperating with said valve means, upon such downward movement, to open said valve means.

13. In a non-freezing stock watering fountain, a bowl supported above the ground, a source of liquid supply buried below the frost line, single conduit means connected between said source and said bowl, animal-actuated movable means associated with said bowl and yieldably biased toward one extreme position but movable to another extreme position, normally-closed valve means disposed below said frost line to control flow from said source through said single conduit means to said bowl, means actuated by movement of said movable means toward said other extreme position to open said valve means, and means actuated by movement of said movable means toward said one extreme position to drain liquid from said bowl through said single conduit means to a point below said frost line.

References Cited by the Examiner

UNITED STATES PATENTS

| | | | |
|---|---|---|---|
| 1,328,207 | 1/20 | Schmidt | 119—75 |
| 1,567,944 | 12/25 | Guymon | 119—75 |

SAMUEL KOREN, *Primary Examiner.*

HUGH R. CHAMBLEE, *Examiner.*

UNITED STATES PATENT OFFICE
CERTIFICATE OF CORRECTION

Patent No. 3,195,511                      July 20, 1965

Joseph Carrol Leary

It is hereby certified that error appears in the above numbered patent requiring correction and that the said Letters Patent should read as corrected below.

Column 12, line 45, for "opposition" read -- opposite -- same column 12, line 64, after "upstanding" insert a comma.

Signed and sealed this 8th day of February 1966.

(SEAL)
Attest:

ERNEST W. SWIDER                      EDWARD J. BRENNER
Attesting Officer                      Commissioner of Patents